United States Patent
Keinath et al.

(10) Patent No.: US 6,501,538 B1
(45) Date of Patent: Dec. 31, 2002

(54) OPTOELECTRONIC ARRANGEMENT FOR DETERMINING AN OBJECT'S PROFILE

(75) Inventors: Armin Keinath, Dettingen; Thomas Müller, Reichenbach/Fils; Jörg Wörner, Weilheim; Jörg Droemer, Bad Urach-Wittlingen, all of (DE)

(73) Assignee: Leuze Electronic GhbH & Co., Owen/Tech (DE)

( * ) Notice: Subject to any disclaimer, the term of this patent is extended or adjusted under 35 U.S.C. 154(b) by 0 days.

(21) Appl. No.: 09/712,200

(22) Filed: Nov. 15, 2000

(30) Foreign Application Priority Data

Nov. 15, 1999 (DE) .......................... 299 19 989

(51) Int. Cl.⁷ .......................... G01C 3/08; G02B 26/08
(52) U.S. Cl. .................... 356/5.01; 359/198; 359/201; 359/209
(58) Field of Search .................... 356/5.01–5.017, 356/1, 5.15, 141.1, 3.01; 359/210, 196–226

(56) References Cited

U.S. PATENT DOCUMENTS

| | | | | |
|---|---|---|---|---|
| 3,589,815 A | * | 6/1971 | Hosterman | 356/167 |
| 3,682,553 A | * | 8/1972 | Kapany | 356/4 |
| 3,883,683 A | * | 5/1975 | Pardes | 178/6 |
| 3,953,667 A | * | 4/1976 | Layton et al. | 178/6 |
| 4,279,507 A | * | 7/1981 | Bulpitt | 356/225 |
| 4,319,332 A | * | 3/1982 | Mehnert | 364/516 |
| 4,615,615 A | * | 10/1986 | Krolak et al. | 356/1 |
| 4,891,799 A | * | 1/1990 | Nakano | 369/45 |
| 4,896,343 A | * | 1/1990 | Saunders | 378/95 |
| 5,200,606 A | * | 4/1993 | Krasutsky et al. | 250/216 |
| 5,253,033 A | * | 10/1993 | Lipchak et al. | 356/5 |
| 5,303,080 A | * | 4/1994 | O'Brien et al. | 359/196 |
| 5,374,817 A | * | 12/1994 | Bard et al. | 235/462 |
| 5,455,670 A | * | 10/1995 | Payne et al. | 356/5.1 |
| 5,515,156 A | * | 5/1996 | Yoshida et al. | 356/5.01 |
| 5,528,354 A | * | 6/1996 | Uwira | 356/5.01 |
| 5,552,893 A | * | 9/1996 | Akasu | 356/5.01 |
| 5,648,852 A | * | 7/1997 | Kato et al. | 356/375 |
| 5,661,551 A | * | 8/1997 | Yamabuchi | 356/5.01 |
| 5,699,150 A | * | 12/1997 | Katayama | 356/4.01 |
| 5,724,123 A | * | 3/1998 | Tanaka | 356/5.01 |
| 5,745,225 A | * | 4/1998 | Watanabe et al. | 356/4.01 |
| 5,790,241 A | * | 8/1998 | Trussell, Jr. | 356/4.01 |
| 5,808,727 A | * | 9/1998 | Katayama | 356/4.01 |
| 5,870,180 A | * | 2/1999 | Wangler | 356/401 |
| 5,933,225 A | * | 8/1999 | Yamabuchi | 356/5.01 |
| 5,949,531 A | * | 9/1999 | Ehbets et al. | 356/5.01 |
| 6,122,040 A | * | 9/2000 | Arita et al. | 356/4.01 |
| 6,137,615 A | * | 10/2000 | Tseng | 359/196 |
| 6,172,754 B1 | * | 1/2001 | Niebuhr | 356/376 |
| 6,249,367 B1 | * | 6/2001 | Hirose | 359/210 |
| 6,262,552 B1 | * | 7/2001 | Sorsa et al. | 318/594 |

FOREIGN PATENT DOCUMENTS

DE 44 05 376 2/1995

\* cited by examiner

*Primary Examiner*—Thomas H. Tarcza
*Assistant Examiner*—Brian Andrea
(74) *Attorney, Agent, or Firm*—Venable; Catherine M. Voorhees

(57) ABSTRACT

A rangefinder apparatus with an optoelectronic arrangement for determining a height profile of an object. The apparatus has a transmitter that emits light rays, a deflection unit that deflects the transmitted light rays and guides them over the surface of an object to be measured, and a receiver that receives light rays reflected from the object. The deflection unit includes a transmitting optic arranged downstream of the transmitter and an actuator which moves the transmitting optic to periodically deflect the transmitted light. A receiving optic is arranged in front of the receiver at a distance from the transmitting optic so that the beam axis of the transmitting light rays penetrates the transmitting optic and the beam axis of the received light rays that penetrate the receiving optic extend at a distance to each other. An evaluation unit is provided which determines the height profile of the object from the range values calculated from the reflected light rays and associated deflection angles for the transmitted light rays.

29 Claims, 3 Drawing Sheets

OPTOELECTRONIC ARRANGEMENT FOR DETERMINING AN OBJECT'S PROFILE

CROSS-REFERENCE TO RELATED APPLICATION

This application claims the priority of German Patent Application No. 299 19 989.4 filed Nov. 15, 1999, the subject matter of which is incorporated herein by reference.

BACKGROUND OF THE INVENTION

The invention relates to an optoelectronic arrangement for determining the height profile of an object with the aid of a range finder including a transmitter that emits light rays and a receiver that receives light rays. The arrangement further comprises a deflection unit for periodically deflecting the transmitting light rays and guiding them over the object surface, wherein the height profile of the object is determined in an evaluation unit based on the range values at the range finder output and the associated deflection angles for the transmitting light rays.

An optoelectronic arrangement of this type is known from German patent document 44 05 376 C1. This arrangement comprises a transmitter for emitting light rays, as well as a receiver for receiving light rays, which together form a range finder operating on the basis of the phase measuring principle. The transmitting light rays are deflected via a deflection unit, so that they sweep a monitoring range in a plane. For this, the deflection unit is provided with a rotating mirror, across which the transmitting light rays and the receiving light rays are guided. An angle transmitter is used to detect the position of the rotating mirror and thus the momentary deflection angle of the transmitting light rays. The position of objects in the monitoring range can be determined from the range values at the range finder output, as well as the output signals from the angle transmitter. In particular, it is also possible to detect the height profile of objects in the monitoring range by scanning their surfaces with the transmitting light rays.

In this arrangement, the deflection unit with rotating mirror represents a moving part with relatively large mass, which is a particular disadvantage if the arrangement is used on machines, for example in outdoor areas. Strong vibrations occur with machines of this type, which can be transmitted to the optoelectronic arrangement and can thus cause faulty measurements or even malfunctions or failures of the arrangement.

Furthermore, the transmitting and receiving light rays for this arrangement are guided coaxial over the rotating mirror. This is a particular advantage for detecting objects in the close-in area, especially those directly in front of the arrangement. However, if the arrangement is to be used outdoors for determining the contours of objects arranged at a longer distance to the arrangement, then the high sensitivity of the arrangement for the close-in range can be a disadvantage. In particular, this is the case if the arrangement is installed on a machine exposed to the development of dust in the surrounding area. In that case, the dust immediately in front of the arrangement will reflect back a portion of the transmitting light rays, thus leading to measuring value distortions during the distance measuring.

SUMMARY OF THE INVENTION

It is an object of the invention to realize an arrangement of the aforementioned type so that it is as insensitive as possible against interfering outside influences.

The above and other objects are accomplished in accordance with the invention by the provision of an optoelectronic arrangement for determining a height profile of an object, comprising: a range finder having an output and including a transmitter that emits light rays and a receiver that receives light rays; a deflection unit for periodically deflecting the transmitting light rays and guiding them over a surface of the object, the deflection unit including a transmitting optic arranged downstream of the transmitter and an actuator for periodically deflecting the transmitting light; a receiving optic arranged in front of the receiver and at a distance from the transmitting optic so that a beam axis of the transmitting light rays that penetrate the transmitting optic and a beam axis of receiving light rays that penetrate the receiving optic extend at a distance to each other; and an evaluation unit, coupled to the output of the range finder and the deflection unit, determining the height profile of the object from range values at the range finder output and associated deflection angles for the transmitting light rays.

The optoelectronic device according to the invention thus comprises a deflection unit which includes an actuator to periodically deflect a transmitting optic arranged downstream of the transmitter.

In addition, a receiving optic is arranged in front of the receiver, at a distance to the transmitting optic, so that the beam axes for the transmitting rays penetrating the transmitting optic and the receiving rays penetrating the receiving optic pass at a distance to each other.

One essential advantage of the arrangement according to the invention is that in order to deflect the transmitting light rays, the transmitting optic is deflected by means of the actuator. In the process, the transmitting optic performs a forced movement that is insensitive to vibrations of the arrangement.

Another advantage is that the transmitting light rays that are guided over the transmitting optic pass at a distance to the receiving light rays guided over the receiving optic. With a suitable selection of the basic distance between transmitting optic and receiving optic, the arrangement becomes insensitive to interfering influences in the close-in range, particularly against dust developing in the area immediately surrounding the optoelectronic arrangement. This is based on the fact that transmitting light rays beamed back from the close-in range do not impinge on the receiver, owing to the distance between transmitting optic and receiving optic, and thus do not cause faulty measurements there.

BRIEF DESCRIPTION OF THE DRAWINGS

The invention is explained in the following with the aid of the drawings, which show in.

DETAILED DESCRIPTION OF THE INVENTION

Figure 1:
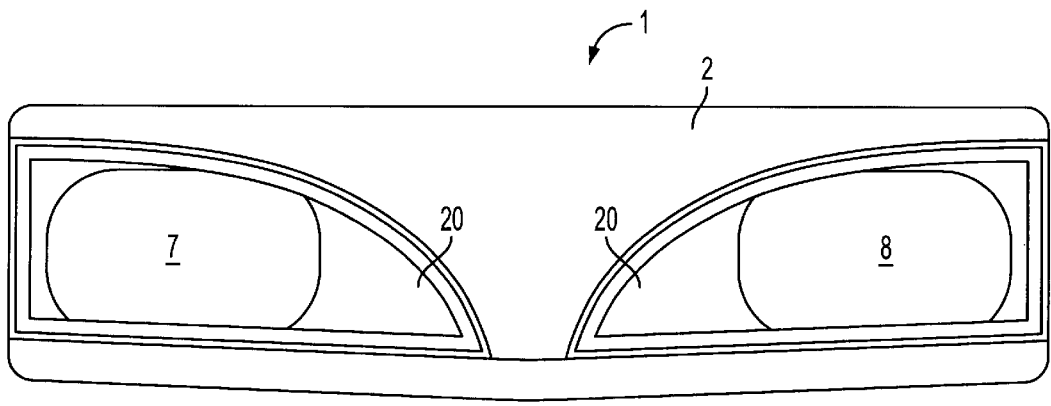
FIG. 1 is a frontal view of an optoelectronic arrangement according to the invention, arranged inside a housing.
Figure 2:
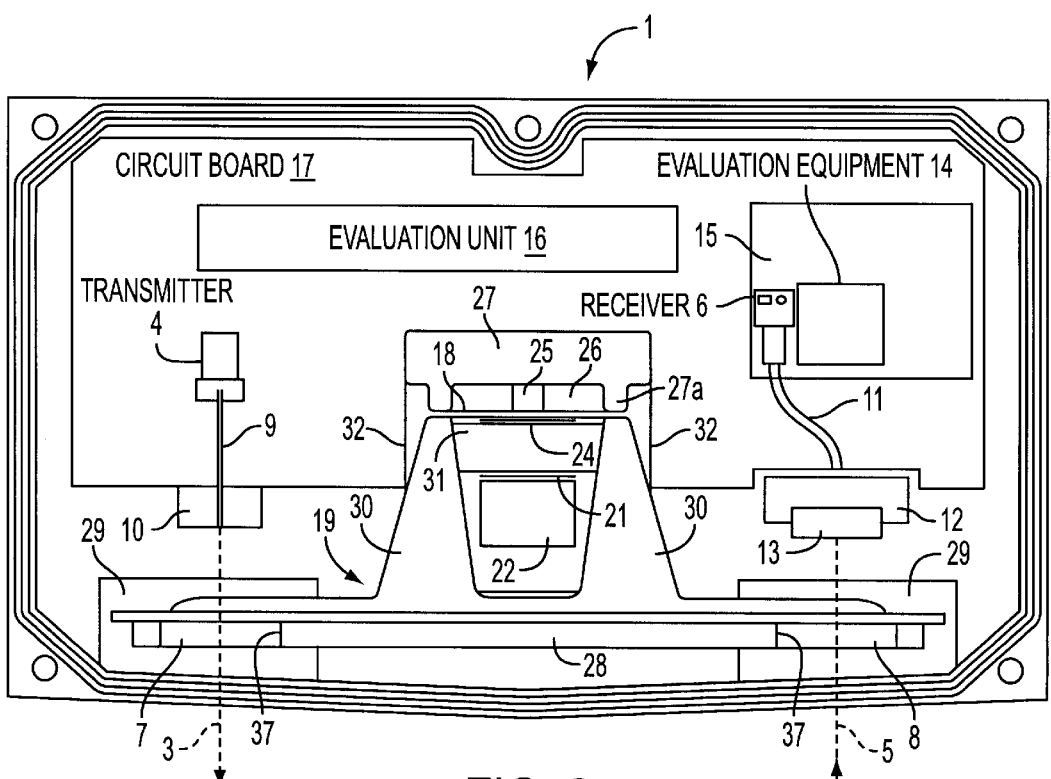
FIG. 2 is a view from above of the device according to FIG. 1, with the housing lid removed.

FIGS. 1 and 2 show an exemplary embodiment of an optoelectronic arrangement 1 for determining the height profile of an object. The optoelectronic arrangement 1 in this case is preferably used outdoors, for example for detecting the profiles of buildings. For this, the optoelectronic arrangement 1 can be positioned on a machine, for example a vehicle.

The optoelectronic arrangement 1 is integrated into a housing 2, which is preferably made of metal and thus is not sensitive to mechanical stresses.

The individual optical and electronic components of the optoelectronic arrangement 1 are mounted on the bottom of housing 2. The housing 2 can be closed off with a housing lid that rests on the housing bottom.

The optoelectronic arrangement 1 comprises a range finder with a transmitter 4 for emitting the light rays 3 and a receiver 6 for receiving the light rays 5. The range is preferably measured based on the transit time principle. For this, the transmitter 4 is operated in the pulsed-mode, so that the transmitter 4 emits light impulses with a predetermined pulse-interval ratio. Accordingly, receiving light pulses that are reflected back by the objects arrive at the receiver 6. For the range measurement, the transit times of the light pulses transmitted to the object and the light pulses reflected back by the object to the receiver 6 are then measured.

A transmitting optic 7 is arranged in the beam path for transmitting light rays 3, downstream of the transmitter 4, which serves to form a beam with transmitting light rays 3. A receiving optic 8 is likewise installed in front of the receiver 6, which guides the receiving light rays 5 onto the receiver 6. A lens 13 is respectively used for the transmitting optic 7 and the receiving optic 8.

For the present exemplary embodiment, the transmitter 4 couples the transmitting light pulses into a first light-guiding fiber 9. The free end of the light-guiding fiber 9 is positioned on a metal receptacle 10 sitting on the housing bottom and is positioned at a distance to the transmitting optic 7.

A second light-guiding fiber 11 accordingly extends from the receiver 6 in the direction of the receiving optic 8. The free end of the light-guiding fiber 11 is positioned on a second metal receptacle 12 and is positioned at a distance to the receiving optic 8. A small lens 13 is arranged in front of the free end of light-guiding fiber 11, which couples the receiving light pulses that penetrate the receiving optic 8 into the light-guiding fiber 11.

An electrical screening 15, preferably consisting of a stamped metal part, surrounds the receiver 6 and the electronic evaluation equipment 14.

The transmitter 4, the receiver 6, as well as the associated electronic evaluation equipment 14 and an evaluation unit 16 with several electronic components that are not shown herein, such as a microcontroller, are mounted on a circuit board 17 that rests on the housing bottom.

The transmitter 4 with transmitting optic 7 and the receiver 6 with receiving optic 8 are arranged at a distance and lateral to the beam axis for the transmitting light rays 3 and the receiving light rays 5. As a result, the beam axes for the transmitting light rays 3 and the receiving light rays 5 extend at a predetermined distance to each other. The device 1 consequently is insensitive to interfering influences at the close-in range. By maintaining a sufficiently large basic distance, only those transmitting light rays 3 arrive at the receiver 6, which are reflected by objects positioned at a sufficiently long distance from the device 1.

If the device 1 is mounted, for example, on a machine causing the development of dust, then a portion of the transmitting light rays 3 is scattered due to the dust kicked up immediately in front of the device 1. However, these light rays do not reach the receiver 6 owing to the long basic distance between transmitting optic 7 and receiving optic 8, so that the range measurement for surveying objects is not hindered.

In order to detect the height profile of an object, the transmitting light rays 3 are periodically deflected via a deflection unit, so that these rays are guided within a specified angular range over the surface of the object. For the present exemplary embodiment, the angular range scanned by the transmitting light rays 3 is approximately ±6°.

The range values issued by the range finder and the momentary deflection angles of the transmitting light rays 3 are continuously detected in the evaluation unit 16. The height profile for the object is computed from these data.

The deflection unit essentially comprises an actuator 18, by means of which the transmitting optic 7 is periodically deflected in a horizontal direction and essentially crosswise to the beam axis for the transmitting light rays 3.

This deflection movement of the transmitting optic 7 deflects the transmitting light rays 3 in a horizontal plane that extends parallel to the housing bottom.

In the simplest case, only the transmitting optic 7 is deflected via the actuator 18, whereas the receiving optic 8 is arranged stationary.

The transmitting optic 7 and the receiving optic 8 for the present exemplary embodiment are positioned in a holder 19 and are thus connected rigidly to each other.

The holder 19 and thus also the transmitting optic 7 and the receiving optic 8 are jointly deflected via the actuator 18. In this way, the change in direction of the transmitting light rays 3, caused by the deflection movement, is also maintained in the same way for the receiving light rays 5.

For the present exemplary embodiment, the transmitting optic 7 and the receiving optic 8 are arranged in a horizontal plane, positioned at a distance to each other and side-by-side, wherein the optical axes for the transmitting optic 7 and the receiving optic 8 run parallel. In principle, the holder 19 could also be arranged in such a way that the transmitting optic 7 and the receiving optic 8 are positioned one above the other, wherein the deflection movement in that case also occurs in vertical direction.

FIG. 2 in particular shows that the transmitting optic 7 and the receiving optic 8 are respectively arranged a short distance behind an exit window 20 (FIG. 1) in the frontal wall of housing 2.

The sizes for the exit windows 20 in this case are adapted to the diameters of the transmitting optic 7 and the receiving optic 8. The exit windows 20 are furthermore dimensioned in such a way that for each position of the transmitting optic 7 and the receiving optic 8, the surface is located almost completely behind the associated exit window 20. As a result, the housing wall shades only small sections of the transmitting optic 7 and the receiving optic 8 surfaces.

Figure 3:
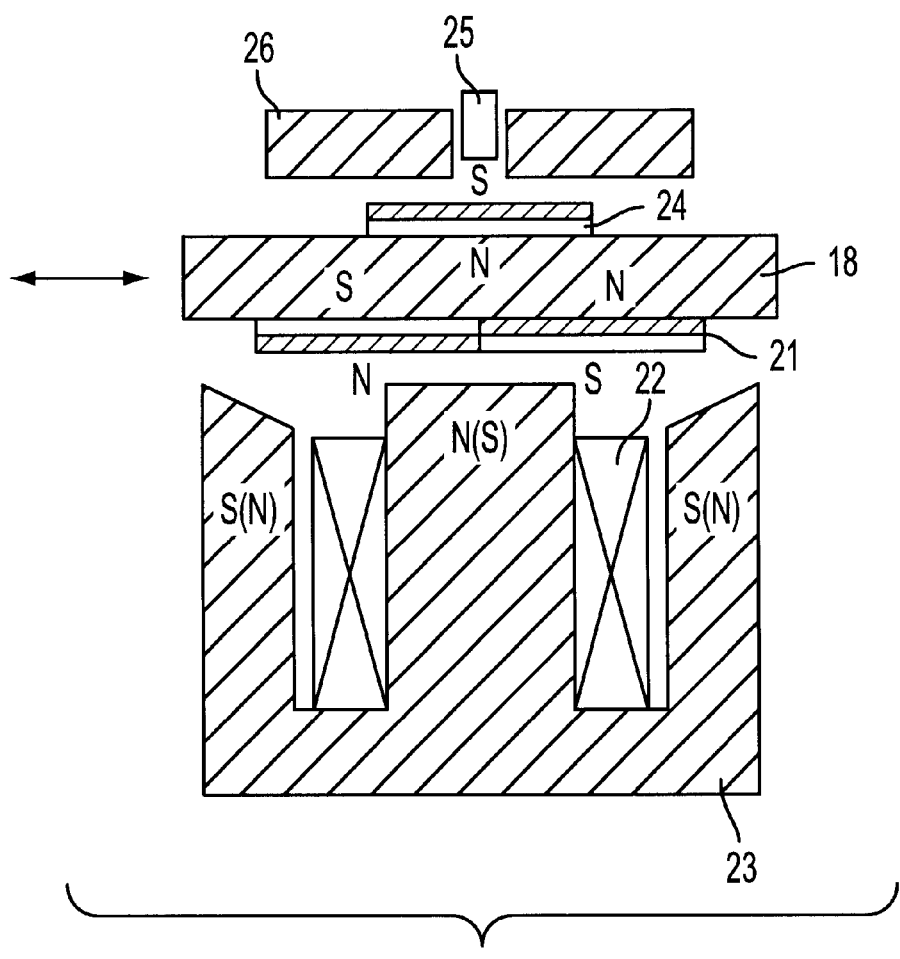
FIG. 3 is a schematic representation of a detail from the arrangement according to FIGS. 1 and 2.

FIG. 3 provides a detailed illustration of the configuration of a first embodiment of actuator 18 for deflecting the transmitting optic 7 and the receiving optic 8 mounted on the holder 19.

The actuator 18 is rod-shaped, with a first permanent magnet 21 attached to one of its longitudinal sides. This longitudinal side with permanent magnet 21 of actuator 18 is located opposite a coil 22 that is positioned in an iron core 23. A current that changes over time and generates a magnetic alternating field flows through the coil 22. As a result, the ends of the iron core 23, which are located opposite the actuator 18, are differently polarized with predetermined timing, as shown in FIG. 3. The different polarities are given the references N and S in FIG. 3. The two outer ends of the iron core 23 respectively always have the same polarity and the end in the center of iron core 23 has the opposite polarity. As a result, the actuator 18 is periodically moved back and forth in the direction of its longitudinal axis. It is useful if the coil current in coil 22 is controlled with the aid of a control circuit, which stabilizes the longitudinal movement of actuator 18.

Another permanent magnet 24 is arranged on the second longitudinal side of actuator 18. In order to determine the current position of actuator 18, the longitudinal side with permanent magnet 24 of actuator 18 is positioned opposite a Hall sensor 25, which is positioned inside a covering 26.

The coil 22 with iron core 23 rests on a metal base, which is not shown herein and projects perpendicular from the housing bottom. The Hall sensor 25 is positioned on a projection 27a leading into the front of a metal plate 27. The projection 27a, which forms one piece with the plate 27, projects perpendicular from the housing bottom.

The actuator 18 is moved in the space remaining between the projection 27a with plate 27 on the one hand and the coil 22 with iron core 23 that is attached to the base on the other hand. The length of the intermediate space in this case is adapted to the length of actuator 18. The intermediate space is slightly wider than the width of actuator 18.

A circuit board 17, not shown herein, with electronic evaluation equipment that is connected to the evaluation unit 16 rests on the Hall sensor 25.

The holder 19 is attached to the actuator 18 and functions to hold the transmitting optic 7 and the receiving optic 8. The holder 19, which consists of a molded plastic part, is provided with a frontal disk 28 for this. Receptacles with circular recesses 37 are provided there, into which the transmitting optic 7 and the receiving optic 8 are inserted and are fastened by means of non-depicted latching means. The front of frontal disk 28 essentially extends in one plane, parallel to the front wall of housing 2. The underside of holder 19 is positioned at a distance to the bottom of housing 2 or the planar element 29, resting thereon.

Two parallel stays 30, positioned at a distance to each other, exit from the backside of the frontal disk 28 of holder 19. The stays 30 extend over the complete height of the frontal disk 28 and are positioned perpendicular to the plane of frontal disk 28. The free ends of the stays 30 are connected via a web 31, on which the actuator 18 is fastened. The web 31 advantageously has two arms, between which the actuator 18 is positioned.

The stays 30 are positioned between the coil 22 with iron core 23, which rest on the base and form an end stop for the stays 30, thus limiting the movement of holder 19.

With the aid of two leaf springs 32, the holder 19 is positioned movably on the plate 27 that forms a receptacle. The leaf springs 32 are made of bendable sheet metal parts with respectively rectangular cross sections. The top and bottom sides of the leaf springs 32 respectively extend perpendicular to the frontal disk 28 and are attached to its back. The leaf springs 32 extend respectively at a short distance to the outsides of the stays 30.

As a result of the longitudinal movement of actuator 18, caused by the current in coil 22, the leaf springs 32 are bent and the frontal disk 28 is moved in the longitudinal direction, parallel to the front wall of housing 2. The spring forces of the leaf springs 32 generate restoring forces to counteract the movement of the frontal disk 28, which is caused by the actuator 18. Controlling the coil current prevents oscillations from occurring in the system, so that the frontal disk 28 performs a continuous periodical longitudinal movement.

As a result of the frontal disk 28 movement, the transmitting optic 7 is displaced relative to the beam axis for the arriving transmitting light rays 3. Owing to the fact that the transmitting light rays 3 impinge at different locations on the transmitting optic 7, a correspondingly different focusing of the transmitting light rays 3 occurs, which causes the desired beam deflection.

Figure 4:
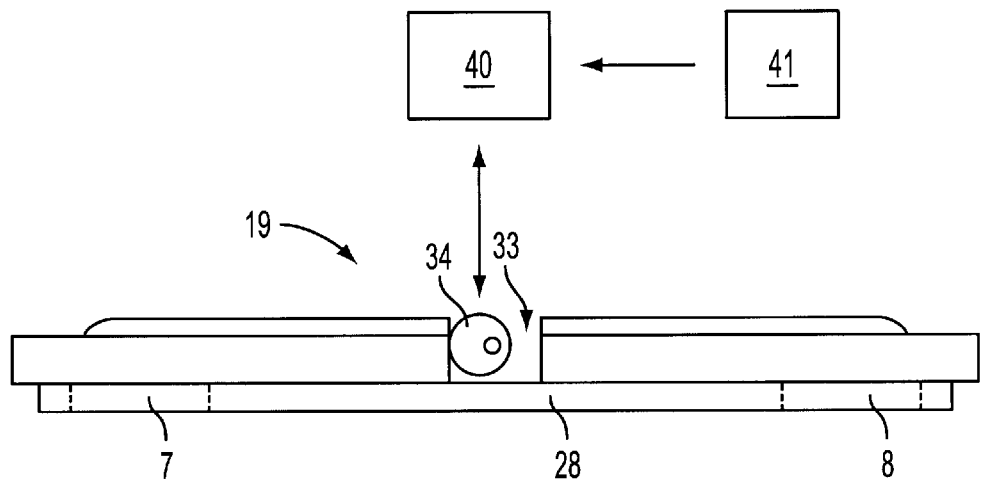
FIG. 4 illustrates a second embodiment of an actuator according to the invention.

FIG. 4 shows a second embodiment of the actuator 18, wherein this FIG. 4 shows a section of the holder 19, to which the non-depicted leaf springs 32 are attached.

The deflection of holder 19 in the longitudinal direction occurs by means of an eccentric disk 34, which is positioned inside a recess 33 on the holder 19. Alternatively, the eccentric disk 34 can be arranged between the stays 30 of holder 19, which are not shown herein. The eccentric disk 34 is positioned so as to rotate around a horizontal rotational axis and is driven with a motor 40. The edge of eccentric disk 34 fits against one inside wall of recess 33. As a result of the rotational movement of the eccentric disk 34, the holder 19, which is positioned on the leaf springs 32, is deflected in the longitudinal direction. The eccentric disk 34 can be driven with a direct-current motor, in which case the eccentric disk 34 performs a continuous rotational movement. If the eccentric disk 34 is driven with the aid of a stepping motor, the eccentric disk 34 can also be moved periodically within a predetermined angular range.

A light barrier 41 can be provided to determine the position of the stepping motor.

Figure 5:
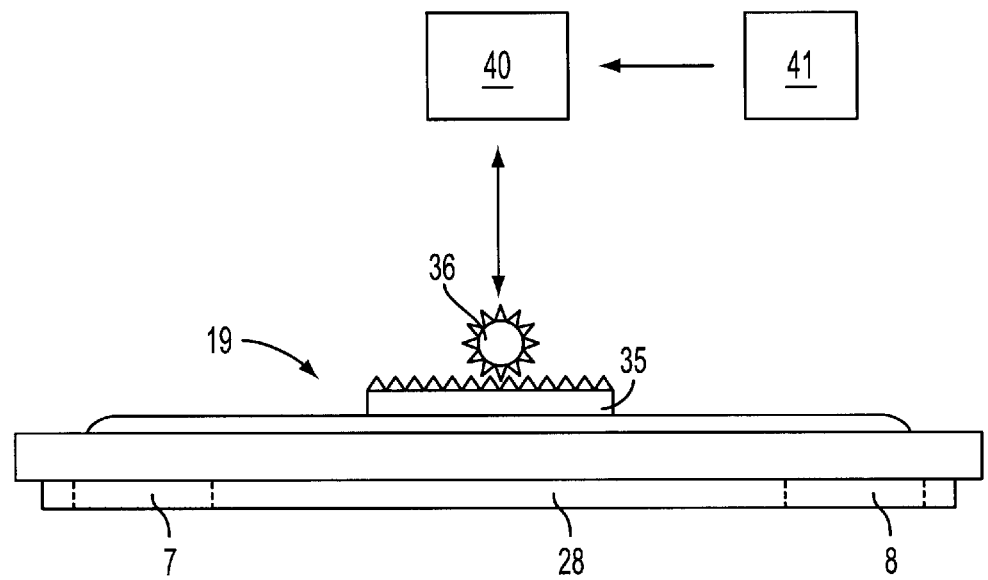
FIG. 5 illustrates a third embodiment of the actuator according to the invention.

FIG. 5 shows a third embodiment of actuator 18. In that case, a toothed rack 35 is provided on the backside of the holder 19. A motor-driven gearwheel 36 engages in this toothed rack 35. The holder 19 is deflected in longitudinal direction through the rotational movement of gearwheel 36. The motor 40 driving the gearwheel 36 can again be a stepping motor, the position of which is monitored with a light barrier 41.

Another embodiment that is not shown herein is provided with an elongated spindle on the holder 19, which spindle extends in the longitudinal direction. The spindle can be activated with a stepping motor and can also deflect the holder 19 in the longitudinal direction. A light barrier is again used to control the stepping motor position.

What is claimed is:

1. An optoelectronic arrangement for determining a height profile of an object, comprising:

a range finder having an output and including a transmitter that emits light rays and a receiver that receives light rays;

a deflection unit including a transmitting optic arranged downstream of the transmitter and an actuator that periodically deflects the transmitting optic in order to periodically deflect the transmitted light rays and guide them over a surface of the object;

a receiving optic arranged in front of the receiver and laterally spaced a distance from the transmitting optic so that a beam axis of the transmitted light rays that penetrate the transmitting optic and a beam axis of received light rays that penetrate the receiving optic pass at a distance to each other, said distance being sufficient to avoid interference between the transmitted light rays and received light rays; and an evaluation unit, coupled to the output of the range finder and the deflection unit, determining the height profile of the object from range values at the range finder output and associated deflection angles for the transmitted light rays, wherein the receiving optic and the transmitting optic are arranged for being jointly deflected by the actuator.

2. The optoelectronic arrangement according to claim 1, wherein the deflection unit further includes a holder deflected by the actuator, and wherein the transmitting optic and the receiving optic have parallel extending optical axes and are positioned in the holder.

3. The optoelectronic arrangement according to claim 2, wherein the holder includes a recess and the actuator further includes a motor-driven eccentric disk having an edge resting in the recess of the holder, wherein the holder is deflected in a longitudinal direction through movement of the eccentric disk.

4. The optoelectronic arrangement according to claim 3, wherein the actuator includes a direct-current motor driving the motor-driven eccentric disk which thus performs a continuous rotational movement.

5. The optoelectronic arrangement according to claim 3, wherein the actuator includes a stepping motor driving the eccentric disk which is thus moved periodically within a predetermined angular range.

6. The optoelectronic arrangement according to claim 2, wherein the holder comprises a toothed rack that extends in a longitudinal direction and a motor-driven gearwheel engages in the toothed rack so that the holder is deflected in a longitudinal direction through a rotational movement of the gearwheel.

7. The optoelectronic arrangement according to claim 2, wherein the holder includes an elongated spindle extending in a longitudinal direction and the actuator includes a stepping motor activating the spindle so that the holder is deflected in a longitudinal direction.

8. The optoelectronic arrangement according to claim 2, wherein the actuator is rod-shaped with longitudinal sides and the arrangement further includes a permanent magnet arranged on one of the longitudinal sides of the rod-shaped actuator so that the actuator can be deflected in a longitudinal direction by a magnetic alternating field.

9. The optoelectronic arrangement according to claim 8, further including an iron core, a coil positioned in the iron core and at a distance to the actuator for generating the magnetic field, and a control circuit controlling a current in the coil.

10. The optoelectronic arrangement according to claim 8, wherein the holder is attached to the actuator.

11. The optoelectronic arrangement according to claim 2, wherein the holder includes a frontal disk in which the transmitting optic and the receiving optic are respectively positioned side-by-side and spaced apart.

12. The optoelectronic arrangement according to claim 11, wherein the frontal disk has a back, stays extending at a distance to each other exiting from the back of the frontal disk and having free ends, and a web connecting the free ends of the stays, the actuator being attached to the web.

13. The optoelectronic arrangement according to claim 12, wherein the stays essentially exit at a right angle to the frontal disk of holder and the frontal disk and the web each have a longitudinal axis extending parallel to one another.

14. The optoelectronic arrangement according to claim 2, wherein the holder comprises a molded plastic part.

15. The optoelectronic arrangement according to claim 11, and further comprising a receptacle and leaf springs positioning the holder on the receptacle so that the holder can move.

16. The optoelectronic arrangement according to claim 15, wherein the leaf springs comprise flexible sheet metal pieces with a rectangular cross section, the top and bottom surfaces of which extend respectively essentially perpendicular to the frontal disk of holder.

17. The optoelectronic arrangement according to claim 15, wherein the holder has a front wall and the receptacle to which the leaf springs are attached comprises a plate extending parallel to the front wall of the holder.

18. The optoelectronic arrangement according to claim 17, further comprising an housing having a front wall and two exit windows, wherein the frontal disk of the holder is positioned behind the front wall of housing and the windows are positioned opposite the transmitting and receiving optics, respectively.

19. The optoelectronic arrangement according to claim 18, wherein the dimensions for exit windows are adapted to diameters of the transmitting optic and the receiving optic, and their displacement paths, so that for each position of the holder, nearly the complete surface of the transmitting optic and the receiving optic is respectively positioned behind the exit window.

20. The optoelectronic arrangement according to claim 19, wherein an angular range of approximately ±6° is scanned with the transmitting light ray.

21. The optoelectronic arrangement according to claim 20, further comprising a sensor detecting a position of the actuator for determining the momentary deflection angle of the transmitted light rays.

22. The optoelectronic arrangement according to claim 21, wherein the sensor comprises a light barrier.

23. The optoelectronic arrangement according to claim 21, wherein the sensor is a Hall sensor for detecting a permanent magnet arranged on the actuator.

24. The optoelectronic arrangement according to claim 23, wherein the Hall sensor and the evaluation unit is mounted on the plate for attaching the leaf springs.

25. The optoelectronic arrangement according to claim 1, wherein the transmitter emits transmitting light pulse, and the range measurement is determined by transit times of the transmitting light pulses to the object.

26. The optoelectronic arrangement according to claim 1, further including electrical screening surrounding the receiver and light-guiding fiber for guiding the receiving light rays to the receiver.

27. The optoelectronic arrangement according to claim 1, further comprising a housing having a bottom and a circuit board that sits on the housing bottom, wherein the transmitter, the receiver, and electronic components of the evaluation unit are arranged on the circuit board.

28. The optoelectronic arrangement according to claim 27, wherein the actuator has elements that sit on the housing bottom.

29. The optoelectronic arrangement according to claim 25, wherein the housing comprises metal.

* * * * *